Aug. 15, 1967   P. R. SOUTHALL   3,336,042
LAWN MOWERS
Filed Aug. 17, 1964                    2 Sheets-Sheet 1
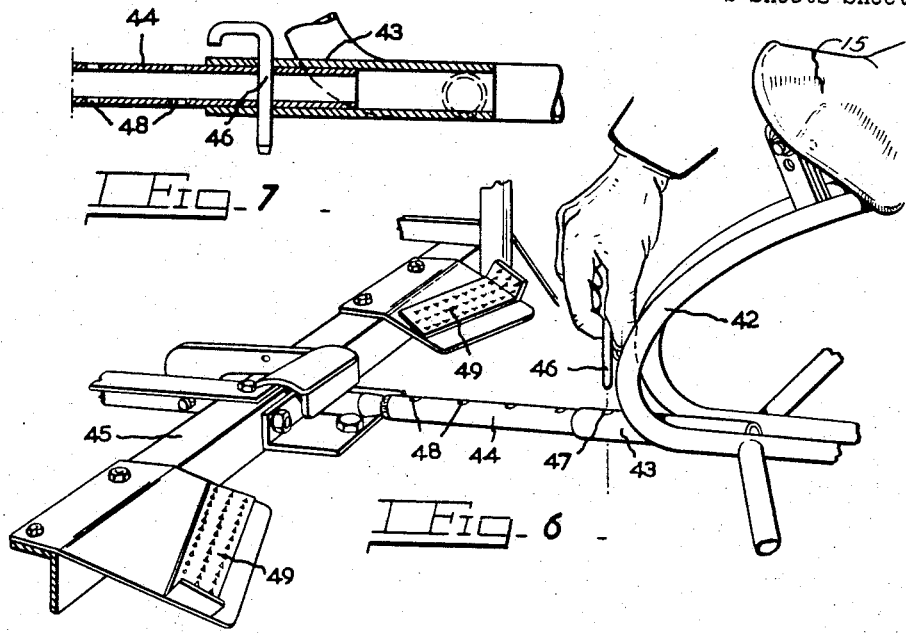
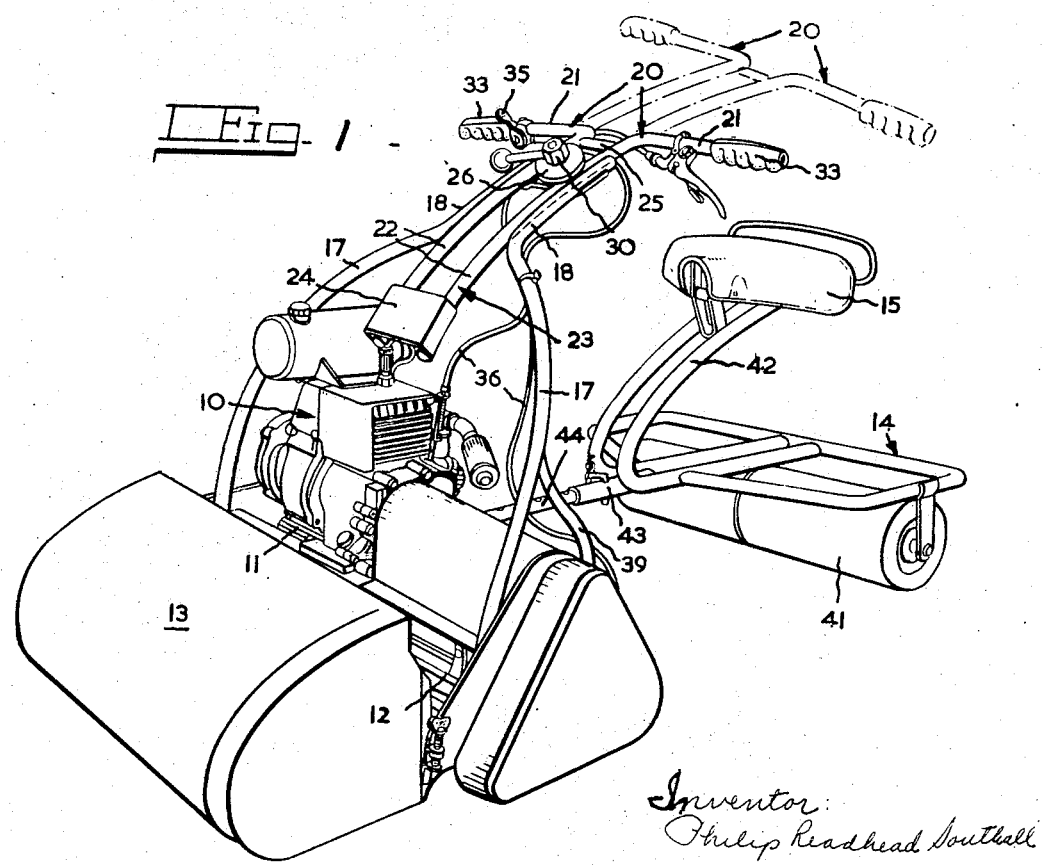
Inventor:
Philip Readhead Southall
Atty.
Kenyon, Palmer, Stewart & Estabrook Aug. 15, 1967  P. R. SOUTHALL  3,336,042
LAWN MOWERS
Filed Aug. 17, 1964  2 Sheets-Sheet 2
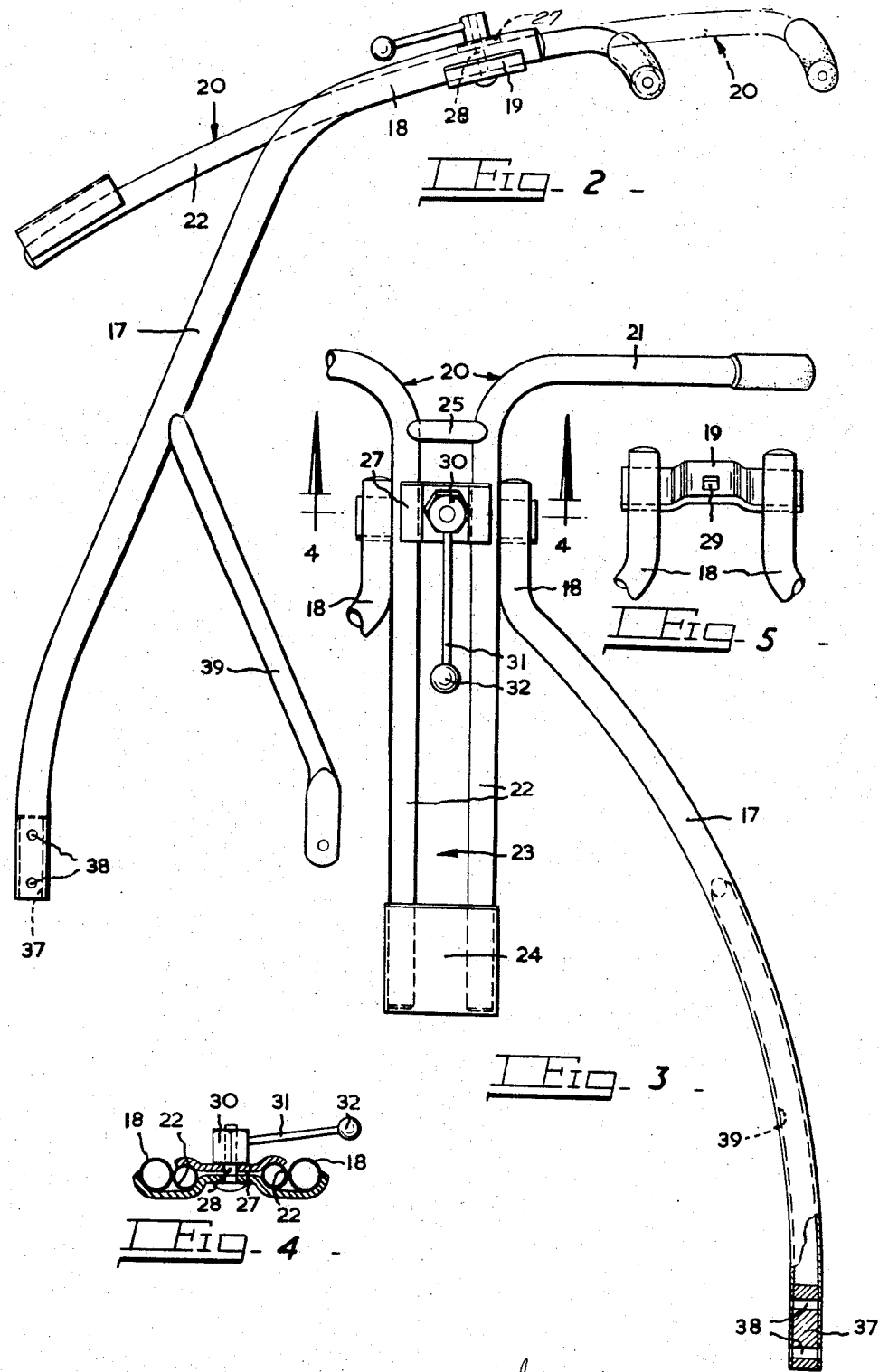
Inventor
Philip Readhead Southall
atty: Kenyon Palmer, Stewart & Estabrook

United States Patent Office 3,336,042
Patented Aug. 15, 1967

3,336,042
LAWN MOWERS
Philip Readhead Southall, Rednal, near Birmingham, England, assignor to H. C. Webb & Company Limited, a British company
Filed Aug. 17, 1964, Ser. No. 389,975
Claims priority, application Great Britain, Aug. 20, 1963, 32,840/63
4 Claims. (Cl. 280—47.37)

This invention relates to power-driven lawn mowers and provides a machine which is specially adapted so that it can be conveniently controlled by an operator either walking behind the machine or riding on a roller-trailer towed by it.

For moving large areas of grass it is convenient for the operator to be able to ride but where finer control is needed the machine is better controlled by walking.

The present invention consists in a power-driven lawn mower which is adapted to be controlled by an operator either walking behind the mower or riding on a roller-trailer towed by the mower and which has steering control handles adjustable between limiting positions one a forward position immediately above the rear of the mower body and the other a rearward position spaced well to the rear of the mower body.

The rearward position is for use when the operator is walking and the forward position when he is riding. The tow-bar of the trailer can be short so that the roller of the trailer more closely follows the path of the mower on turns. Foot-rests may be provided on the back of the mower and may be used to assist steering. Rear foot-rests may also be provided on the trailer.

The handles may be mounted for adjustment in a variety of ways. Preferably they are mounted on arms secured to the mower body and are adjustable relative to the arms between the limiting positions. The handles may be slidably mounted in a head carried by the outer arms which includes clamping means for retaining the handles in the limiting positions.

An embodiment of the invention will now be described by way of example with reference to the accompanying drawings in which, FIGURE 1 is a perspective view of a mower according to the present invention with a roller trailer.

FIGURE 2 is a side view of steering control handles of the mower and arms carrying the handles.

FIGURE 3 is a fragmentary front view of the handles and arms.

FIGURE 4 is a section on line 4—4 of FIGURE 3.

FIGURE 5 is a detail view of the upper ends of the arms.

FIGURE 6 is a perspective view showing an adjustable tow-bar of the trailer and its connection to the back of the mower.

FIGURE 7 is a detail view in section of part of the tow-bar.

The mower, as shown in FIGURE 1, is powered by an internal combustion engine 10 mounted above and driving a split land roller 11 and cutter clylinder 12. A detachable grass box 13 is fitted on the front of the mower and to the back of the mower is coupled a roller trailer 14 on which a seat 15 is provided for the mower operator. Secured to the forward part of side plates 16 of the mower are the lower ends of tubular arms 17. The arms 17 rise from their lower end connections rearwards over the engine 10 and roller 11 and curve convergently towards their upper ends. Near their upper ends the arms 17, as shown in FIGURE 3, cease to converge and are bent to form parallel outer end portions 18 which are spaced a short distance apart and form in effect a rearwardly directed head. A tie plate 19 is secured by welding to the underside of, and extends between the extremities of, the parallel outer end portions 18 of the arms 17, as shown in FIGURE 5. The parallel outer end portions 18 are more rearwardly inclined than the remaining portions of the arms and are slightly curved.

The arms 17 carry handles 20 for steering the mower, as shown in FIGURES 1 to 3, which are adjustable relative to the arms between a forward position, this is the position shown in full lines in the drawings, for use when the mower operator is riding on the trailer 14, and a rearward position, indicated in broken lines in FIGURES 1 and 2, for use when the operator is walking. The handles 20 are tubular and are each bent to substantially L-shape, the shorter portions 21 of which are oppositely directed and aligned to form the handles proper and the longer portions 22 of which are arranged parallel to one another to form a stem 23 which is slidable between the parallel end portions 18 of the arms 17. The stem forming portions 22 are connected at their outer ends by a plate 24 and near to the junction with the portions 21 by a cross-piece 25. The stem 23 is curved so that during adjustment it follows the line of the parallel portions 18 of the arms 17.

The stem 23 is held in an adjusted position by a clamp 26 which is formed partly by the tie plate 19, underlying the stem, and partly by a clamping plate 27, overlying the stem. This clamping plate 27 is connected to the tie plate 19 by a bolt 28 whose shank is passed through an aperture 29 in the tie plate 19, FIGURE 5, and through the clamping plate 26, as shown in FIGURE 4, and is fitted with a nut 30. Screwed into the nut 30 is one end of a bar 31 which extends radially from the nut and is fitted at its other end with a knob 32. This bar 31 provides a lever for turning the nut 30 to tighten or slacken the clamp 26. The aperture 29 in the tie plate 19 and the portion of the shank of the bolt 28 directly engaging with it are of square shape so that the bolt is prevented from turning when the nut 30 is turned.

The shorter portions 21 of the handles 20 forming the handles proper are fitted with hand-grips 33, a clutch control lever 34 and engine throttle control 35. The clutch control lever 34 and throttle control 35 operate through Bowden cables 36 which are of such length as to allow for movement of the handles between the forward and rearward positions.

The lower end of each arm is closed by a plug 37, FIGURE 3, fitted in the bore of the arm. The arms are secured to the forward parts of the side plates 16 by bolts, not shown, passed through the side plates 16 and through apertures 38, FIGURES 2 and 3, provided through the lower ends of the arms and the closure plugs 37, and fitted with nuts, not shown. To add rigidity to the arms, each arm has welded to its lower portion the upper end of a strut 39 which is secured at its lower end to the rear part of the side plate 16 to which the arm is secured.

The trailer 14 is of conventional design with a frame 40, FIGURE 1, mounted on a split roller 41 and a seat frame 42 on the frame 40 which supports the seat 15 above the roller 41. The frame 40 has a central, forwardly-directed, horizontal tube 43, FIGURES 6 and 7, into which is fitted telescopically a tow-bar 44 coupled releasably and universally at its forward end to a rear frame member 45 of the mower. The tow-bar 44, as shown in FIGURES 6 and 7, is anchored in the tube 43 by a pin 46 passed through holes 47 in the forward end of the tube 43 and any one pair of a series of pairs of spaced holes 48 along the length of the tow-bar 44 brought into alignment with the holes 47 by sliding the tow-bar 44 in the tube 43. By providing a series of spaced holes 48 in the tow-bar the distance of the roller behind the mower can be adjusted to suit the requirements of the operator. The distance of the roller behind the mower is normally kept as short as possible so that the roller more closely follows the path of the mower on turns.

As shown in FIGURE 6, foot-rests 49 are mounted on the rear frame member 45 of the mower for the operator and may be used to assist in the steering of the mower. Foot-rests may also, if desired, be provided on the frame 40 of the trailer.

I claim:

1. A power-driven lawn mower comprising a mower body having means for detachably coupling a trailer to its rear, arms rigidly secured to the mower body and having steering control handles having hand-grips portions, means mounting said steering control handles for movement on said arms which is substantially horizontal relative to the arms between a forward limiting position, in which position the mower is controlled by an operator riding on the trailer, and a rearward limiting position in which the hand-grip portions are spaced well to the rear of the mower, in which position the mower is controlled by an operator walking behind the mower, and the arms and steering control handles in combination having a formation changing in direction between upwards adjacent the mower body and rearwards near the hand-grip portions.

2. A power-driven lawn mower according to claim 1 and further comprising a head at the upper end of the arms, the steering control handles having a stem slidable in the head to enable movement of the handles relative to the arms between said forward limiting position and said rearward limiting position, and the head having means for clamping the stem in adjusted positions in and between said limiting positions.

3. A power-driven lawn mower according to claim 2 wherein the arms rise rearwards above the rear of the mower and curve convergently towards their upper end portions which are parallel to one another and form the head; the head is rearwardly directed and curved; and the stem is curved similarly to the head so that the stem follows the curvature of the head during adjustment of the handles between said limiting positions.

4. The combination of a power-driven lawn mower according to claim 1 and a trailer having a seat and a tow-bar coupled detachably at one end to the rear of the mower and connected at the other end to the trailer and the mower further having foot-rests at the rear and the tow bar having means for enabling the length of the tow-bar to be adjusted to alter the distance of the trailer behind the mower and thereby the seat from the foot-rests.

References Cited

UNITED STATES PATENTS

| | | | |
|---|---|---|---|
| 2,701,616 | 2/1955 | Cooper | 180—52 X |
| 2,760,789 | 8/1956 | Wampler | 280—515 X |
| 2,919,756 | 1/1960 | Knipe | 280—47.37 X |
| 2,925,287 | 2/1960 | Morris | 280—515 X |
| 2,955,835 | 10/1960 | Chouinard | 180—12 X |
| 2,965,386 | 12/1960 | Buske | 280—47.37 |
| 3,130,444 | 4/1964 | Stollsteimer | 280—47.37 |

FOREIGN PATENTS 723,103   2/1955   Great Britain.

BENJAMIN HERSH, *Primary Examiner.*

C. C. PARSONS, *Assistant Examiner.*